United States Patent
Hayashi

(10) Patent No.: US 7,261,382 B2
(45) Date of Patent: Aug. 28, 2007

(54) RESERVOIR TANK FOR VEHICLE BRAKE SYSTEM

(75) Inventor: Mitsuharu Hayashi, Nishio (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/940,970

(22) Filed: Sep. 15, 2004

(65) Prior Publication Data

US 2005/0062343 A1    Mar. 24, 2005

(30) Foreign Application Priority Data

Sep. 18, 2003    (JP) .............................. 2003-325639

(51) Int. Cl.
*B60T 17/00* (2006.01)

(52) U.S. Cl. ..................... 303/1; 303/115.1; 60/585

(58) Field of Classification Search ............... 303/1, 303/115.1; 137/574, 308; 220/200; 60/585, 60/588
See application file for complete search history.

(56) References Cited

U.S. PATENT DOCUMENTS

| | | | | |
|---|---|---|---|---|
| 2,782,799 A | * | 2/1957 | Vobbe | 137/887 |
| 3,427,807 A | * | 2/1969 | Gordon | 60/589 |
| 5,269,431 A | * | 12/1993 | Sakata et al. | 220/203.17 |
| 6,105,611 A | * | 8/2000 | Ando et al. | 137/558 |
| 7,052,207 B1 | * | 5/2006 | Wimberger | 405/40 |

FOREIGN PATENT DOCUMENTS

| | | |
|---|---|---|
| JP | 06-156254 | 6/1994 |
| JP | 10-035469 | 2/1998 |

* cited by examiner

*Primary Examiner*—Melody M. Burch
(74) *Attorney, Agent, or Firm*—Buchanan Ingersoll & Rooney PC

(57) ABSTRACT

A reservoir tank has an inlet/outlet port communicating with a master cylinder, and a hydraulic fluid supply port provided directly opposite the inlet/outlet port. A tubular portion is provided on the inner surface of the tank. The tubular portion has an internal passage communicating with the inlet/outlet port and having a top opening. A box-shaped member has its bottom plate fitted on the tubular member. The bottom plate is formed of a filter material. A deflector plate is supported on legs extending upwardly form the bottom plate of the box member so as to be disposed right over the top opening of the tubular portion. The deflector plate deflects the flow of hydraulic fluid such that it will not be directed toward the hydraulic fluid supply port, thereby preventing hydraulic fluid from being blown out through the hydraulic fluid supply port even if this port is open.

4 Claims, 6 Drawing Sheets

RESERVOIR TANK FOR VEHICLE BRAKE SYSTEM

BACKGROUND OF THE INVENTION

This invention relates to a reservoir tank which is structured to be mounted on a master cylinder or a hydraulic pressure booster in a vehicle brake system.

FIG. 10 shows a conventional reservoir tank of this type which is disclosed in unexamined JP patent publication 10-35469. This reservoir tank, generally designated 110, comprises a tank body 111 made of a synthetic resin, and mounted on a master cylinder 1 with its ports 112 and 114 connected to corresponding ports of the master cylinder 1. The body 111 has a hydraulic fluid supply port 113 in its top through which hydraulic fluid a is supplied into the tank 110. Through the ports 112, hydraulic fluid flows between the reservoir and the master cylinder. Through the ports 114, hydraulic fluid a is supplied to the master cylinder 1 and/or hydraulic units such as pumps. Numeral 115a designates a strainer.

JP patent publication 06-156254 discloses a similar reservoir tank of which the interior is divided into a first fluid chamber and a second fluid chamber, with the inlet/outlet port 112 and the hydraulic fluid supply port 113 communicating with the first fluid chamber and the outlet ports 114 communicating with the second fluid chamber.

Because this type of reservoir tank is installed in a narrow, limited space in a vehicle engine room, its mounting position is limited. That is, in most cases, it has to be mounted with the hydraulic fluid supply port 113 facing upward.

Component parts of this type of vehicle brake system have to be frequently replaced or removed for repair. After such replacement or repair, air has to be expelled from the brake system. This is done by pumping the brake pedal with the cap 115 of the hydraulic fluid supply port 113 removed to mount a brake fluid injector or a brake fluid can on the reservoir tank 110.

When pumping the brake pedal, hydraulic fluid a tends to gush into the reservoir tank through the inlet/out let port 112. As shown, the ports 112 and 113 directly face each other. Thus, hydraulic fluid rushing into the reservoir tank tends to be blown out through the port 113. Hydraulic fluid blown out through the port 113 may find its way into an operator's eye or stain clothes. This causes deterioration in the work environment and health hazard.

An object of the invention is to provide a reservoir tank having means for preventing hydraulic fluid from being blown out through the hydraulic fluid supply port even when this port is open.

SUMMARY OF THE INVENTION

To achieve this object, a deflector is provided in the reservoir tank at such a position that hydraulic fluid discharged into the reservoir tank through the inlet/outlet port is deflected by the deflector in such a way that hydraulic fluid will not be directed toward the hydraulic fluid supply port.

Specifically, there is provided a reservoir tank for use in a vehicle brake system including a master cylinder and/or a hydraulic pressure booster, the reservoir tank comprising a tank body having a fluid chamber therein and formed with an inlet/outlet port adapted to be brought into communication with the master cylinder or the hydraulic pressure booster, and a hydraulic fluid supply port, the inlet/outlet port communicating with the hydraulic fluid supply port through the fluid chamber, and being oriented such that any hydraulic fluid discharged through the inlet/outlet port into the fluid chamber is directed toward the hydraulic fluid supply port, the reservoir tank including a deflector provided in the fluid chamber for deflecting hydraulic fluid discharged through the inlet/outlet port into the fluid chamber so as not to be directed toward the hydraulic fluid supply port.

A preferable deflector is a deflector plate positioned and sized such that hydraulic fluid discharged through the port into the fluid chamber hits against the deflector plate and is deflected so as not to be directed toward the hydraulic fluid supply port. In one arrangement, an upwardly extending tubular portion is provided on the inner surface of the tank body. The tubular portion has an internal passage communicating with the inlet/outlet port and having a top opening. The internal passage serves as an extension of the inlet/outlet port. The reservoir tank further includes a plate member fitted on the tubular portion. The deflector plate is supported on a leg member protruding upwardly from the plate member so as to be spaced from and facing the top opening of the tubular portion.

With this arrangement, simply by fitting the plate member on the tubular portion, the deflector plate can be positioned properly.

Preferably, the fluid chamber is divided into a first fluid chamber and a second fluid chamber by a partitioning wall and the plate member, and the plate member is made of a filter material so that hydraulic fluid can flow between the first fluid chamber and the second fluid chamber through the plate member. In this case, the hydraulic fluid supply port is provided so as to communicate with the first fluid chamber, and the tank body is further formed with an outlet port communicating with the second fluid chamber for supplying hydraulic fluid in the second fluid chamber to the master cylinder and/or other external hydraulic units.

With this arrangement, since the deflector plate and the filter are preassembled, they can be made smaller in size and manufactured at a lower than when they are prepared separately from each other. Preferably, the plate member is a bottom wall of a box-shaped member supported by the partitioning wall because such a box-shaped member can be more easily supported by the partitioning wall.

Another preferable deflector comprises a cylindrical member extending upwardly from the inner surface of the tank body and having an internal passage communicating with the inlet/outlet port, and a deflector plate fitted in the cylindrical member, the deflector plate being formed with holes along the outer circumference thereof, whereby hydraulic fluid discharged through the inlet/outlet port is deflected laterally by hitting against the central portion of the deflector plate, and flows through the holes out of the cylindrical member. Still another preferable deflector is a deflector plate supported on a leg protruding from an inner surface of the tank body, the deflector plate having a surface facing the inlet-outlet port.

Yet another preferable deflector is a tubular member provided on the inner surface of the tank body, the tubular member having an internal passage communicating with the inlet/outlet port and having an opening communicating with fluid chamber, the opening being oriented such that hydraulic fluid discharged through the opening will not be directed toward the hydraulic fluid supply port.

The deflector prevents hydraulic fluid discharged into the reservoir tank through the inlet/outlet port from being blown out through the hydraulic fluid supply port even if the hydraulic fluid supply port is open. This prevents deterioration in the work environment and health hazard.

Thus, the reservoir tank can be mounted in an optimum position in a narrow, limited space in a vehicle engine room.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
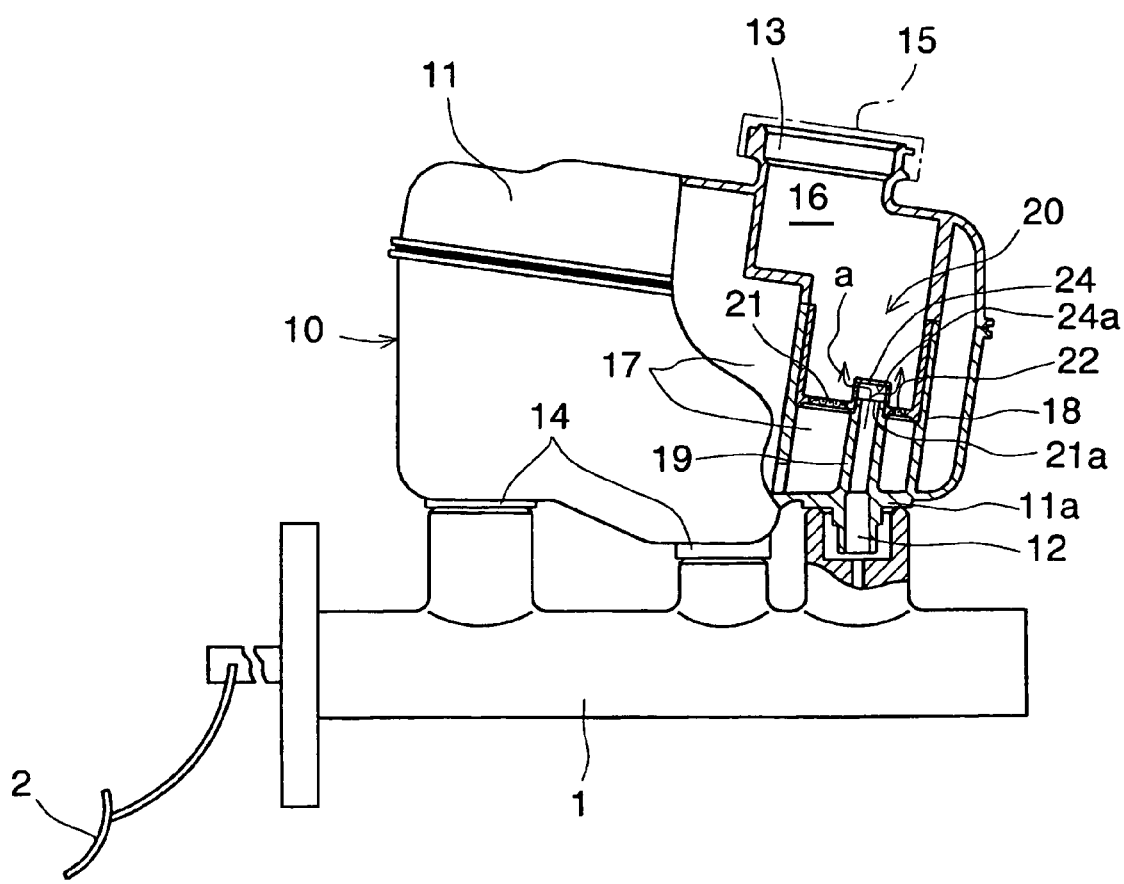
FIG. 1 is a partially cutaway front view of an embodiment of the present invention.
Figure 2:
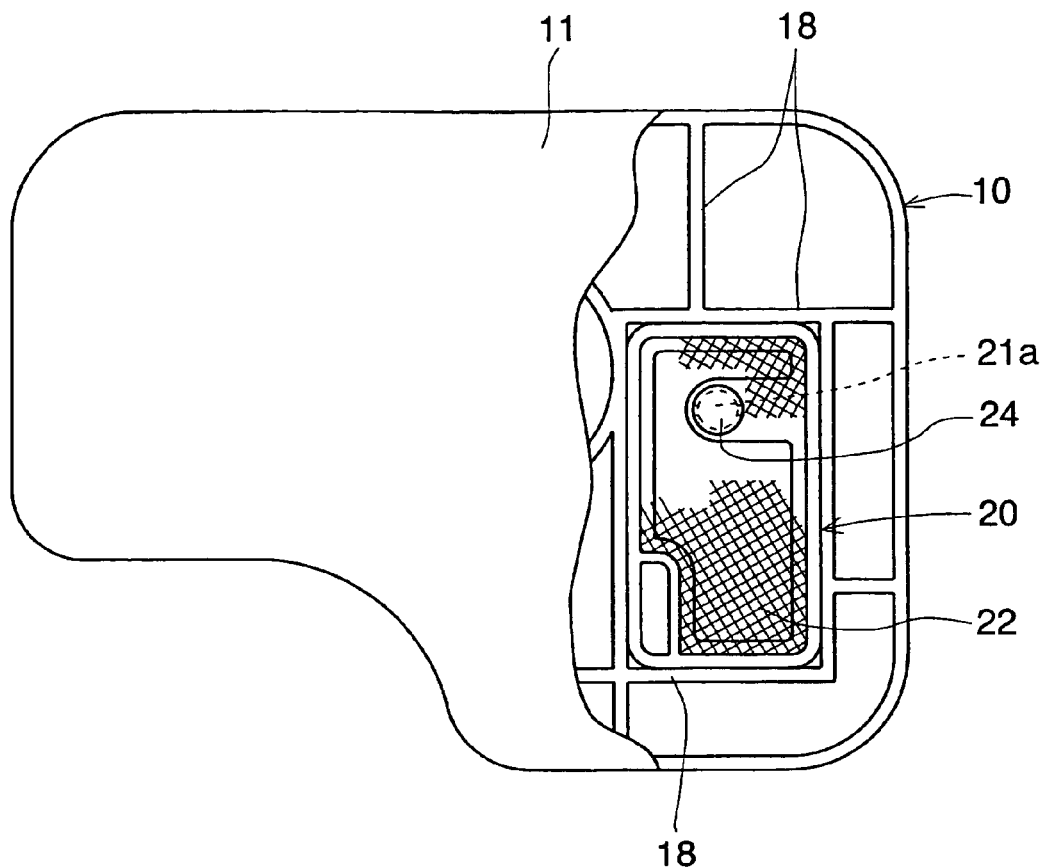
FIG. 2 is a partially cutaway plan view of the same.
Figure 3:
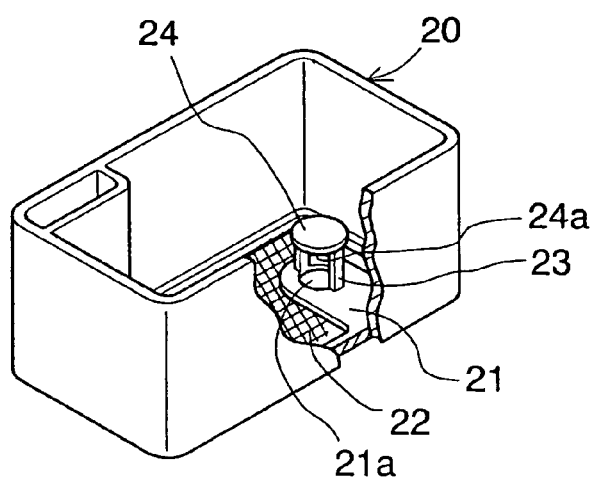
FIG. 3 is a partially cutaway perspective view of an element of the same.

The embodiment of FIGS. 1-3 is a reservoir tank 10 in a vehicle brake system for controlling brake hydraulic pressure. The reservoir tank 10 includes a tank body 11 formed of a synthetic resin and mounted on a master cylinder 1 with its ports 12 and 14 connected to corresponding ports of the master cylinder 1. A partitioning wall 18 is provided in the tank body 11. (Throughout the drawings, not the entire partitioning wall 18 is shown.) The partitioning wall 18 prevents pulsation of hydraulic fluid a. As shown in FIGS. 1 and 2, an open-topped box-shaped member 20 (see FIG. 3) is supported by the partitioning wall 18. The box member 20 has a bottom plate 21. The partitioning wall 18 and the bottom plate 21 of the box member 20 divide the interior of the tank 10 into a first fluid chamber 16 and a second fluid chamber 17. The tank 10 is formed with a hydraulic fluid supply port 13 communicating with the first fluid chamber 16. The outlet ports 14, through which hydraulic fluid a is supplied to the master cylinder 1 and/or hydraulic elements such as a pump, communicate with the second fluid chamber 17.

The inlet/outlet port 12, through which hydraulic fluid a flows between the master cylinder 1 and the reservoir tank 10, is formed in a bottom wall 11a of the tank body 11. The tank body 11 has a tubular portion 19 extending from the bottom wall 11a to the bottom plate 21 of the box member 20, with its top end inserted in a hole 21a formed in the bottom plate 21. The tubular portion 19 has an internal passage communicating at its bottom end with the port 12 and at its top end with the first fluid chamber 16. Thus, the port 12 communicates with the first fluid chamber 16 through internal passage of the tubular portion 19. Except the area where the hole 21a is formed, the bottom plate 20 is a filter 22. Hydraulic fluid a from the master cylinder 1 thus flows through the port 12 into the first fluid chamber 16 and then flows through the filter 22, where fine debris such as rubber pieces and fine powders are removed, into the second fluid chamber 17. The thus filtered hydraulic fluid a is then supplied to various hydraulic elements.

Right over the hole 21a, a deflector means or plate 24 is supported by two legs 23 extending vertically from the edge of the hole 12a. The deflector plate 24 deflects hydraulic fluid a blown upwardly into the first fluid chamber 16 through the hole 21a in lateral directions as shown by arrows in FIG. 1. The port 12, the hole 21a and the hydraulic fluid supply port 13 are substantially aligned with each other as shown in FIG. 1. Thus, without the deflector plate 24, during bleeding of air after replacement of brake parts, if hydraulic fluid a rushes into the first fluid chamber 16 through the hole 21a, it may partially blow out through the port 13. The deflector plate 24 will deflect the flow of hydraulic fluid and thus prevent hydraulic fluid from being blown out through the port 13. The number of legs 23 is not limited unless they noticeably interfere with the flow of hydraulic fluid a.

Figure 4:
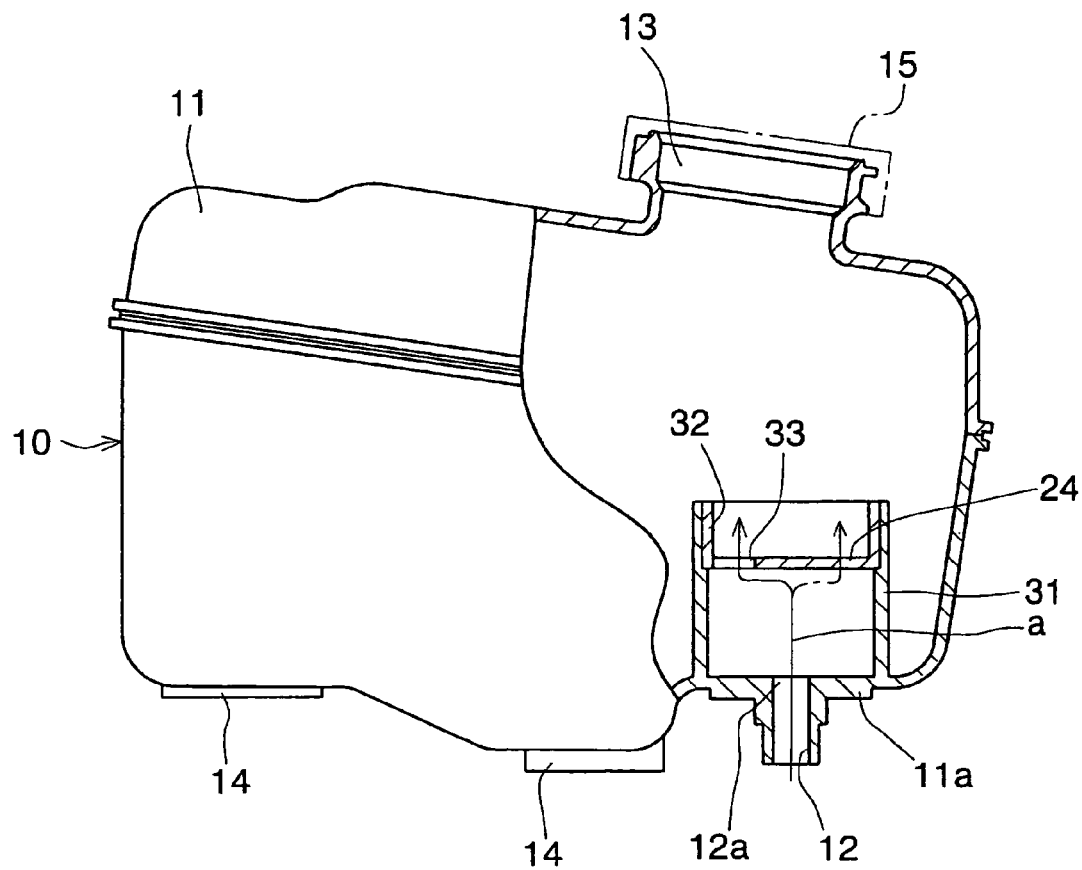
FIG. 4 is a partially cutaway front view of another embodiment.
Figure 5:
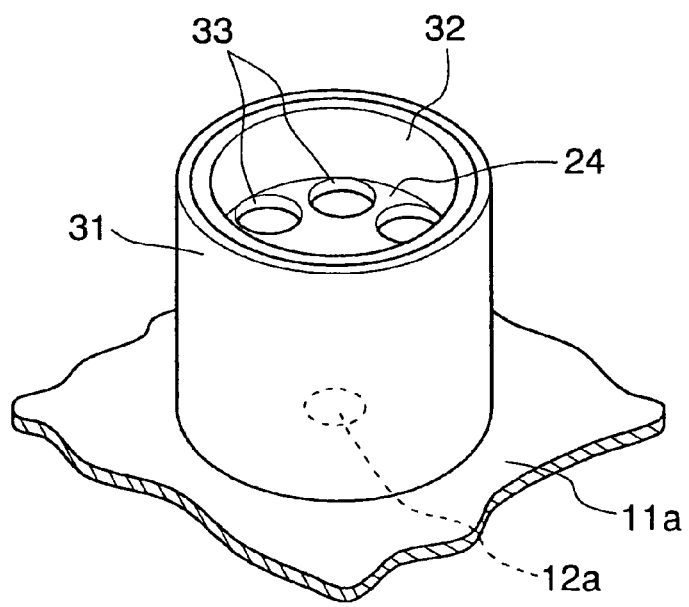
FIG. 5 is a partial perspective view of the embodiment of FIG. 4.

In the embodiment of FIGS. 4 and 5, a cylindrical portion 31 is formed on the inner surface of the bottom wall 11a of the tank body 11 around the inner opening 12a of the inlet/outlet port 12. A cylindrical member 32 having a bottom plate 24 as a deflector plate is received in the cylindrical portion 31. The deflector plate 24 is formed with a plurality of holes 33. Any hydraulic fluid a rushing through the port 12 into the cylindrical portion 31 hits against the central portion of the plate 24, is deflected laterally, and passes through the holes 33 (see arrows in FIG. 4). By the time the hydraulic fluid passes through the holes 33, its flow speed will slow down significantly, so that it will never blow out through the port 13. The number and positions of the holes 33 are determined such that the deflector plate 24 can sufficiently deflect the flow of hydraulic fluid but will not unduly interfere with the flow of hydraulic fluid. Otherwise, they are not limited.

Figure 6:
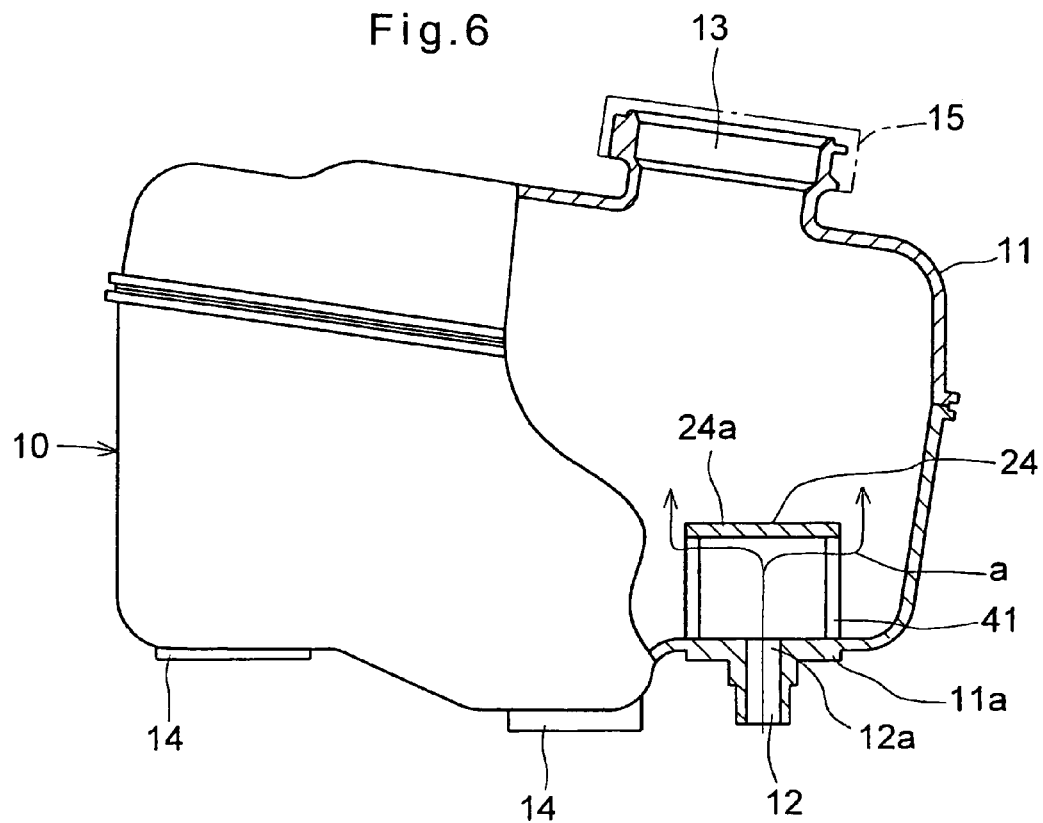
FIGS. 6-9 are partially cutaway front views of other embodiments.

FIGS. 6-9 show embodiments having different deflector means. The deflector means in the embodiment of FIG. 6 is a deflector plate 24 supported on legs 41 extending upwardly from the bottom wall 11a of the tank body 11 around the port 12 so as to be disposed right over the port 12. Hydraulic fluid a rushing into the tank through the port 12 hits against the deflector plate 24 and is deflected as shown by arrows.

Figure 7:
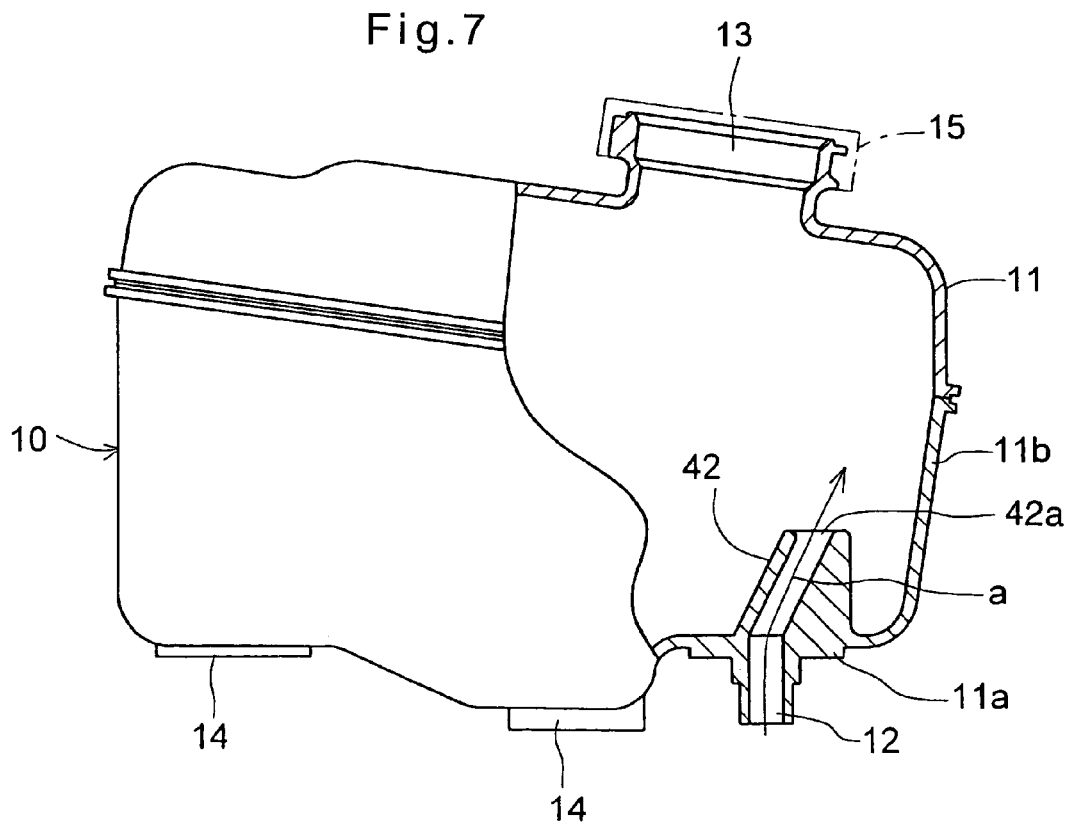
Figure 8:
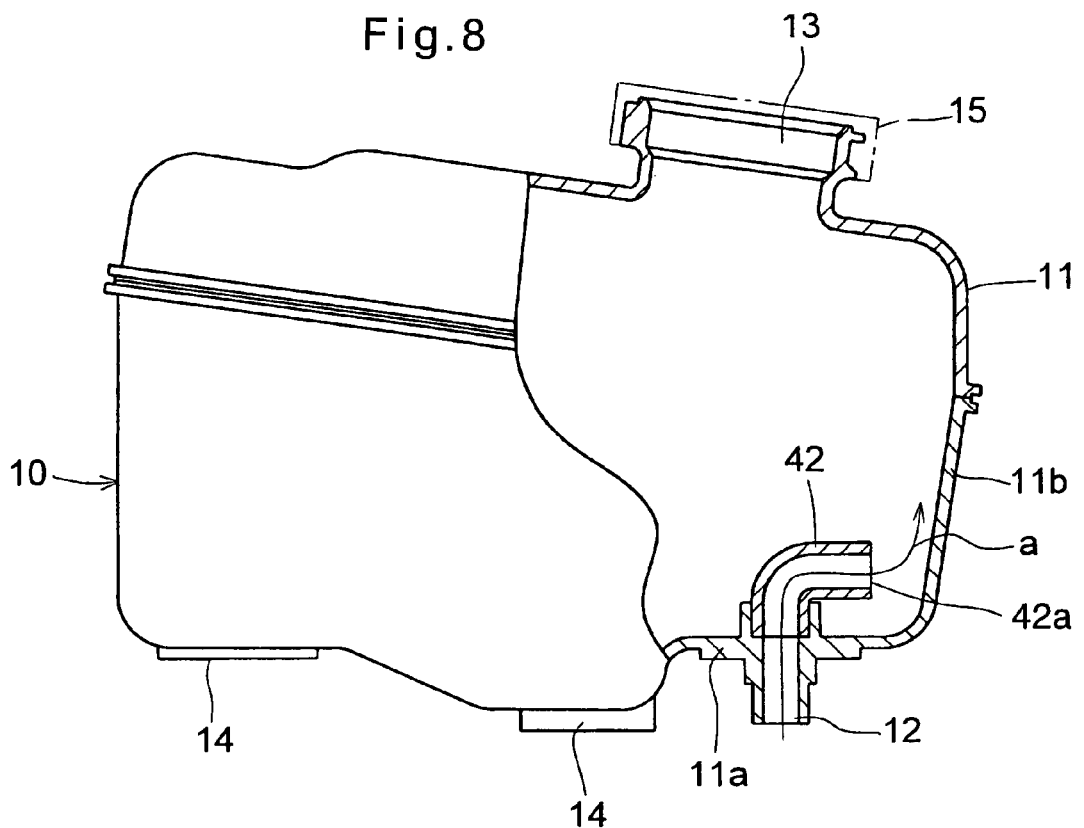

The deflector means in either of the embodiments of FIGS. 7 and 8 is a tubular member 42 formed on the inner surface of the bottom wall 11a of the tank body 11 so as to surround the port 12. The tubular member 42 has an opening 42a oriented such that hydraulic fluid a blown out through the opening 42a will not be directed toward the hydraulic fluid supply port 13. For example, the opening 42a is oriented toward the side wall 11b of the tank body 11. The tubular member 42 in the embodiment of FIG. 7 is an integral part of the tank body 11. The tubular member 42 in the embodiment of FIG. 8 is a separate member from the tank body 11 and is pressed into and/or bonded to a flange formed around the port 12 as shown, or bonded or otherwise fixed to the bottom wall 11a around the port 12.

Figure 9:
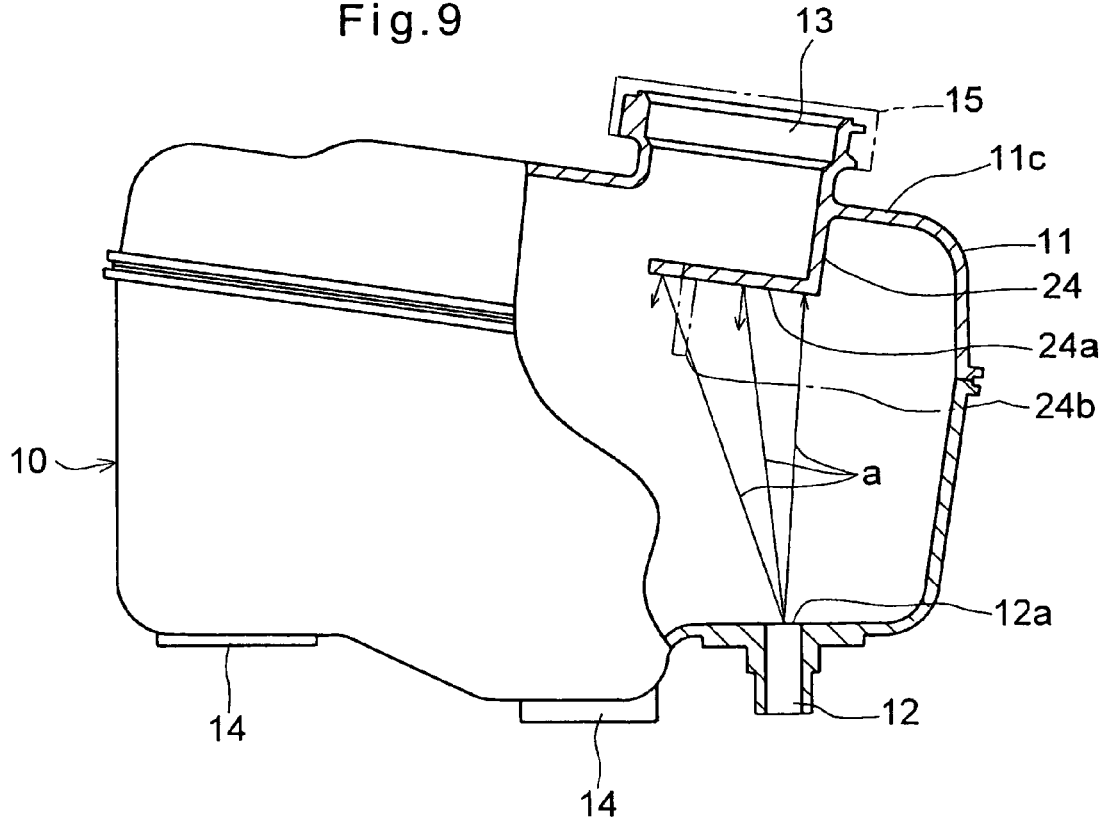
Figure 10:
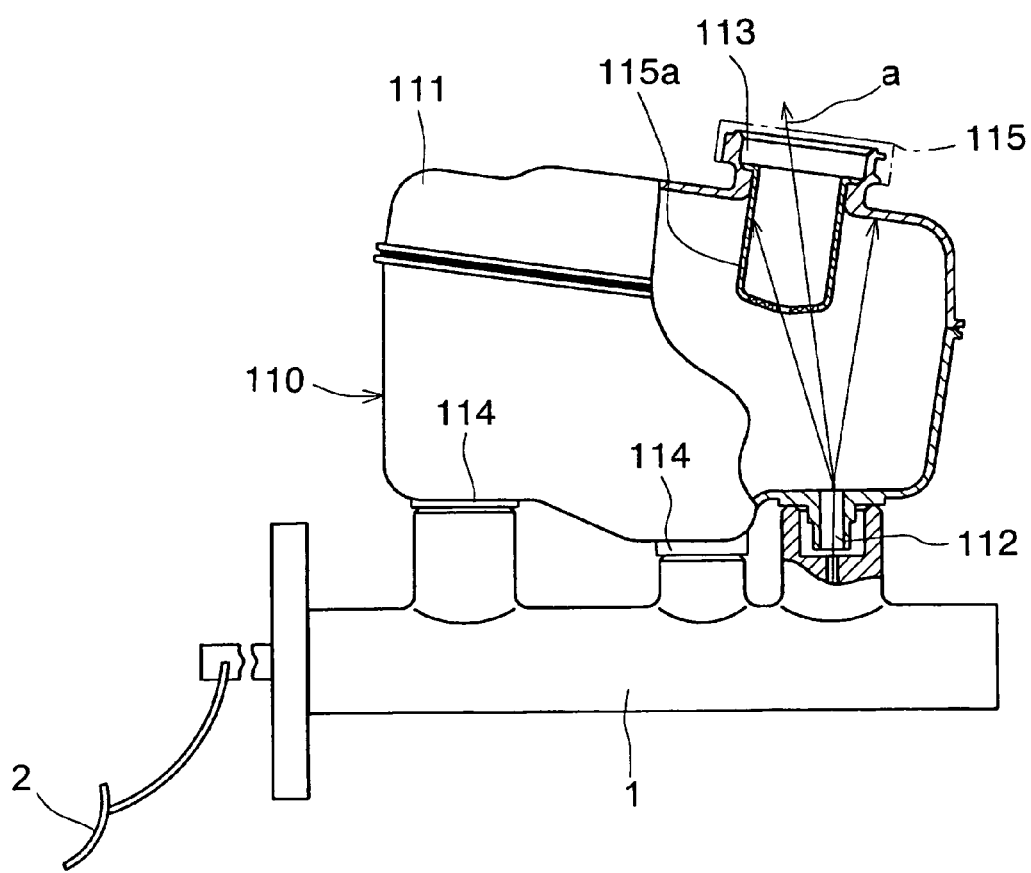
FIG. 10 is a partially cutaway front view of a conventional reservoir tank.

In the embodiment of FIG. 9, a deflector member 24 having an L-shaped section hangs from the top wall 11c of the tank body 11 in which is formed the hydraulic fluid supply port 13. The deflector member 24 includes a horizontal plate 24a. A substantially vertically extending auxiliary deflector plate 24b may be provided on the underside of the horizontal plate 24a as shown by phantom line. If the plate 24b is provided, the portion of the horizontal plate 24a hidden by the plate 24b as viewed from the port 12 is not necessary and thus is omitted. The area and position of the horizontal plate 24a and/or the vertical plate 24b are determined such that any hydraulic fluid blown through the port 12 toward the port 13 hits against the horizontal plate 24a or 24b and is deflected, and such that the plates 24a and 24b will not unduly interfere with the flow of hydraulic fluid. Otherwise, their areas and positions are not limited.

The concept of the present invention is applicable to both a reservoir of which the interior is divided into the first fluid chamber 16 and the second fluid chamber 17 by the filter 22 and the partitioning wall 18 as shown in FIGS. 1-3 and a reservoir of which the interior is not partitioned at all. The deflector means may be provided not only at the port 12 but also at one or both of the ports 14. Further, the concept of this invention is also applicable to a reservoir tank for a hydraulic pressure booster.

What is claimed is:

1. A reservoir tank for use in a vehicle brake system including a master cylinder and/or a hydraulic pressure booster, said reservoir tank comprising a tank body having a fluid chamber therein and formed with an inlet/outlet port adapted to be brought into communication with the master cylinder or the hydraulic pressure booster, and a hydraulic fluid supply port, said inlet/outlet port communicating with said hydraulic fluid supply port through said fluid chamber, and being oriented such that any hydraulic fluid passing through said inlet/outlet port toward said fluid chamber is directed toward said hydraulic fluid supply port, said reservoir tank including a deflector provided in said fluid chamber for deflecting hydraulic fluid discharged from said inlet/outlet port so that a major portion of the hydraulic fluid passing through the inlet/outlet port toward the hydraulic fluid supply port is deflected by the deflector so as not to be directed toward said hydraulic fluid supply port;

wherein said deflector is a deflector plate positioned and sized such that hydraulic fluid discharged through said inlet/outlet port hits against said deflector plate and is deflected so as not to be directed toward said hydraulic fluid supply port, the hydraulic fluid which hits against said deflector being deflected by the deflector before the hydraulic fluid enters said fluid chamber;

an upwardly extending tubular portion provided on the inner surface of said tank body, said tubular portion having an internal passage communicating with said inlet/outlet port and having a top opening, said internal passage serving as an extension of said inlet/outlet port so that hydraulic fluid passing through said inlet/outlet port enters the internal passage before entering the fluid chamber, said reservoir tank further including a plate member fitted on said tubular portion, said deflector plate being supported on a leg member protruding upwardly from said plate member so as to be spaced from and facing said top opening of said tubular portion; and wherein said fluid chamber is divided into a first fluid chamber and a second fluid chamber by a partitioning wall and said plate member, and wherein said plate member is made of a filter material, whereby hydraulic fluid can flow between said first fluid chamber and said second fluid chamber through said plate member, said hydraulic fluid supply port communicating with said first fluid chamber, said tank body being further formed with an outlet port communicating with said second fluid chamber for supplying hydraulic fluid in said second fluid chamber to the master cylinder and/or other external hydraulic units.

2. The reservoir tank of claim 1 wherein said plate member is a bottom wall of a box-shaped member supported by said partitioning wall.

3. A reservoir tank for use in a vehicle brake system including a master cylinder and/or a hydraulic pressure booster, said reservoir tank comprising a tank body having a fluid chamber therein and formed with an inlet/outlet port adapted to be brought into communication with the master cylinder or the hydraulic pressure booster, and a hydraulic fluid supply port, said inlet/outlet port communicating with said hydraulic fluid supply port through said fluid chamber, and being oriented such that at least a portion of an imaginary continuation of the inlet/outlet port passes through the hydraulic fluid supply port, said reservoir tank including a deflector provided in said fluid chamber for deflecting hydraulic fluid discharged from said inlet/outlet port so that a major portion of the hydraulic fluid passing through the inlet/outlet port toward the hydraulic fluid supply port is deflected by the deflector so as not to be directed toward said hydraulic fluid supply port, said imaginary continuation of the inlet/outlet port passing through the deflector;

wherein said deflector is a deflector plate positioned and sized such that hydraulic fluid discharged through said inlet/outlet port hits against said deflector plate and is deflected so as not to be directed toward said hydraulic fluid supply port, the hydraulic fluid which hits against said deflector being deflected by the deflector before the hydraulic fluid enters said fluid chamber;

an upwardly extending tubular portion provided on an inner surface of said tank body, said tubular portion having an internal passage communicating with said inlet/outlet port and having a top opening, said internal passage serving as an extension of said inlet/outlet port so that hydraulic fluid passing through said inlet/outlet port enters the internal passage before entering the fluid chamber, said reservoir tank further including a plate member fitted on said tubular portion, said deflector plate being supported on a leg member protruding upwardly from said plate member so as to be spaced from and facing said top opening of said tubular portion; and wherein said fluid chamber is divided into a first fluid chamber and a second fluid chamber by a partitioning wall and said plate member, and wherein said plate member is made of a filter material, whereby hydraulic fluid can flow between said first fluid chamber and said second fluid chamber through said plate member, said hydraulic fluid supply port communicating with said first fluid chamber, said tank body being further formed with an outlet port communicating with said second fluid chamber for supplying hydraulic fluid in said second fluid chamber to the master cylinder and/or other external hydraulic units.

4. The reservoir tank of claim 3 wherein said plate member is a bottom wall of a box-shaped member supported by said partitioning wall.

* * * * *